(12) United States Patent
Hogenmiller et al.

(10) Patent No.: US 6,819,138 B2
(45) Date of Patent: Nov. 16, 2004

(54) DIVIDING AND DISTRIBUTING THE DRIVE STRENGTH OF A SINGLE CLOCK BUFFER

(75) Inventors: David Hogenmiller, Cedar Park, TX (US); Harsh Sharma, Austin, TX (US); Shervin Hojat, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 108 days.

(21) Appl. No.: 10/288,407

(22) Filed: Nov. 4, 2002

(65) Prior Publication Data

US 2004/0085094 A1 May 6, 2004

(51) Int. Cl.[7] ............... H03K 19/0175; H03K 19/003; G06F 1/04
(52) U.S. Cl. ...................... 326/82; 326/31; 327/293
(58) Field of Search ................. 326/83, 21, 29, 326/31, 34; 327/293, 295–297

(56) References Cited

U.S. PATENT DOCUMENTS 5,804,987 A * 9/1998 Ogawa et al. ................ 326/40
6,525,569 B1 * 2/2003 Leon ............................ 326/83
6,577,165 B1 * 6/2003 Cheung et al. ............... 326/93
6,686,785 B2 * 2/2004 Liu et al. ..................... 327/158

FOREIGN PATENT DOCUMENTS

JP          02292839 A  * 12/1990  ........... H01L/21/66

* cited by examiner

Primary Examiner—James H. Cho
(74) Attorney, Agent, or Firm—Gunnison, McKay & Hodgson, L.L.P.; Lisa A. Norris

(57) ABSTRACT

Devices, methods, and networks that divide and proportionally distribute the drive strength of a clock buffer such that the output drive strength of the clock buffer is divided proportionally among a plurality of outputs from the clock buffer. In one embodiment, the present invention selectively couples adjacent parallel inverters present in a clock buffer to separate, internal distribution wires. The internal distribution wires are selectively coupled to one or more outputs by a connector wire to provide proportional, multiple outputs of the drive strength from the clock buffer to a clock network.

19 Claims, 7 Drawing Sheets

DIVIDING AND DISTRIBUTING THE DRIVE STRENGTH OF A SINGLE CLOCK BUFFER

BACKGROUND OF THE INVENTION

1. Field of the Invention

The present invention relates generally to microprocessors, and more particularly, to microprocessor clock buffers.

2. Description of Related Art

Currently, most mainstream electronic components and systems, such as microprocessors, are synchronous systems employing one or more system clocks that act as the driving force or "heart" of the electronic system. As a result, more often than not, it is critical that a given system clock signal arrive at various points in the system at nearly the same time.

Conventionally, clock buffers are used to boost the clock signal for distribution throughout the clock network(s) in the microprocessor. Relatively speaking, clock buffers tend to cover a very large area of a microprocessor, both in terms of the physical size the clock buffer occupies on the microprocessor and the area its output wires cover.

FIG. 1 illustrates a schematic diagram of a microprocessor 102 having a clock network 100 including a clock buffer 110 found in the prior art. In FIG. 1, microprocessor 102 includes clock buffer 110 having parallel inverters 114–124 which boost a clock signal input to wire 112. Although six inverters are illustrated in the FIG. 1 for clarity of description, more typically, a greater number of inverters are utilized, such as sixteen or thirty-two inverters. In some devices, other amplifying devices are used rather than inverters, such as, for example, transistors, or banks of transistors or inverters.

For the purposes of timing analysis, it is convenient to assume that the entire drive strength, e.g., generated current, of clock buffer 110 can be output, or sourced, from a single source point 128 to clock network 100. This timing abstraction, termed point source modeling, is used for modeling the timing of the clock network signal at different network levels in the microprocessor but ignores that the actual drive strength is distributed over the physical area of clock buffer 110. This timing abstraction limits the accuracy at the next timing level and also limits the hardware performance of microprocessor 102 as described below.

In FIG. 1, each inverter 114–124 is internally coupled along a single wire 126, and outputs current onto wire 126. Due to the large current carried on wire 126, it is very wide. The current is then converged at a central source point 128 for output from clock buffer 110 to clock network 100. From source point 128, wires 130 and 132 further distribute the current to clock network 100, such as an H-tree network. Due to the large current carried on wires 130 and 132, they are also very wide.

Conventionally, wires, such as wires 126, 130 and 132, are routed on the metal layers of a microprocessor. Further, most semiconductor manufacturing processes and integrated circuit design teams typically route wires in one direction on each metal layer with adjacent metal layers routed orthogonal to each other. Thus, in order to route the current of clock network 100 in different directions, the current is routed from source point 128 of wire 126 to an adjacent metal layer or layers of microprocessor 102 containing differently directed wires 130 and 132.

In many clock networks, such as an H-tree network, this routing between adjacent metal layers is often accomplished using conductive vias. Typically, there is a large via array (not shown) at source point 128 for routing the current from wire 126 to wires 130 and 132 (on a different metal layer) for further distribution to clock network 100.

In terms of current, all of the drive strength is spread out over the width of clock buffer 110 as each of inverters 114–124 outputs current along the length of wire 126. Then, the current from each inverter 114–124 is internally converged at one central point, e.g., source point 128, before the current is routed back out over wires 130 and 132 for distribution to the much larger area of clock network 100, and sometimes in the direction from which the current originally came. Thus, all of the current from each half of the drive strength is transported over one wire, e.g., wire 126, for output from central source point 128 to clock network 100. For example, clock buffer 110 can be 300 microns wide, and the current from clock buffer 110 output to clock network 100 that is 2 millimeters×2 millimeters in size. With this prior art technique, the current from outermost inverters 114 and 124 traverse approximately 150 microns on wire 126 to arrive at source point 128 before further distribution to clock network 100. Current from inverters 116–122, which are located closer to source point 128, traverse lesser distances dependent upon the position of the individual inverter 116–122 relative to source point 128.

This technique presents several disadvantages. First, the current output from the inverters 114–124 is initially spread out over the width of the clock buffer 110, and then the current is converged at central source point 128 before the current is spread out again and routed to clock network 100, sometimes resulting in the current being routed back over the direction from which the current originally came. This generates extra work and slows down the current, e.g., the clock signal.

Second, to carry the large current load, wires 126, 130, and 132 are very wide. From a manufacturing standpoint, wide metal wires don't behave the same in the manufacturing process as narrow metal wires. In narrow metal wires, the oxide on the sides of the narrow metal wire provides support to the width of the metal during planarization processes, such that the narrow metal wire comes out square and rectangular. Whereas with wide metal wires, the oxide on the sides of the metal can't provide enough support to the entire width of the metal, and thus dishing of the metal during manufacturing becomes a problem.

Third, the circuitry associated with wide metal wires is more difficult to design. For example, if a wire is narrow enough and the resistance is strong enough, inductance becomes a negligible factor in the design of the circuit. However, the wider the wire becomes, the more problematic the factor of inductance becomes in the circuit. Calculating the effect of inductance in this situation is a very complicated extraction and simulation problem requiring additional design time.

Fourth, wide wires use a larger amount of routable space in a microprocessor, and in many cases, there is seldom enough space between power rails in a microprocessor to fabricate a wide wire.

Fifth, it is very difficult to design the via array and wire mass associated with distribution of the current from source point 128 so that the current comes evenly through all the vias for distribution to the clock network. It is through the vias that all the current has to change from one direction to another, and often current crowding occurs. If there are a large number of vias in a via array, it is difficult to guarantee that they are all being used. Typically, current tends to utilize the vias at the edges of the via array rather than those in the center of the via array making it difficult to determine if the vias are electromigration clean.

SUMMARY OF THE INVENTION

According to the principles of this invention, there are provided devices, methods, and networks that divide and proportionally distribute the drive strength of a clock buffer such that the output drive strength of the clock buffer is divided proportionally among a plurality of outputs from the clock buffer.

According to one embodiment, a buffer device having an output drive strength includes: a plurality of amplifying devices; and a plurality of outputs conductively coupled to the plurality of amplifying devices such that the output drive strength of the buffer device is divided proportionally among the plurality of outputs. In some embodiments, the plurality of outputs are conductively coupled to the plurality of amplifying devices by a connector wire such that the output drive strength of the buffer device is divided proportionally among the plurality of outputs. In some embodiments, the connector wire is selectively coupled to at least one of a plurality of distribution wires, wherein each of the plurality of distribution wires conductively couples a first amplifying device and a second amplifying device of the plurality of amplifying devices, the first amplifying device being adjacent to the second amplifying device.

In another embodiment, a network includes: a buffer device having an output drive strength, the buffer device dividing and proportionally distributing the output drive strength for output over multiple outputs; a plurality of network segments coupled to at least some of the multiple outputs of the buffer device; and a plurality of wires coupling the at least some of the multiple outputs of the buffer device to the plurality of network segments, the plurality of wires being coupled to at least some of the multiple outputs of the buffer device such that the drive strength of the buffer device is proportionally distributed over the buffer device and output to the network segments.

In a further embodiment, a method for dividing and distributing the drive strength of a single clock buffer to a clock network includes: obtaining a plurality of parallel inverters, each of the plurality of parallel inverters generating an equal drive strength; internally coupling different adjacent pairs of the plurality of parallel inverters with a plurality of distribution wires, wherein each one of the plurality of distribution wires couples a different adjacent pair of the plurality of parallel inverters; internally coupling at least some of the plurality of distribution wires to at least some of a plurality of outputs, wherein each of the at least some of the plurality of outputs is coupled to a different distribution wire such that the output drive strength of the clock buffer is divided proportionally among the plurality of outputs; and coupling segments of a clock network to at least some of the plurality of outputs so that the drive strength of the clock buffer is proportionally distributed to the clock network. In some embodiments, the at least some of the plurality of distribution wires are internally coupled to the at least some of the plurality of outputs by a connector wire such that the output drive strength of the buffer device is divided proportionally among the at least some of the plurality of outputs.

As a result of these and other features discussed in more detail below, devices, methods, and networks designed according to the principles of the present invention allow more efficient distribution of clock signals to a clock network when compared to the prior art technique earlier described.

It is to be understood that both the foregoing general description and the following detailed description are intended only to exemplify and explain the invention as claimed.

BRIEF DESCRIPTION OF THE DRAWINGS

The accompanying drawings, which are incorporated in, and constitute a part of this specification illustrate embodiments of the present invention, and together with the description, serve to explain the principles of the invention.

In the drawings.

DETAILED DESCRIPTION

The invention will now be described in reference to the accompanying drawings. The same reference numbers may be used throughout the drawings and the following description to refer to the same or like structure.

According to the several embodiments of the present invention, there are provided devices, methods, and networks that divide and proportionally distribute the drive strength of a clock buffer such that the output drive strength of the clock buffer is divided proportionally among a plurality of outputs from the clock buffer. In one embodiment, the present invention selectively couples adjacent parallel inverters, or other amplifying devices, such as transistors, uniform banks of transistors, and uniform banks of inverters, present in a clock buffer to separate, internal distribution wires. The internal distribution wires are selectively coupled to one or more outputs by a connector wire to provide proportional, multiple outputs of the drive strength from the clock buffer to a clock network.

The present invention delivers current more efficiently in various directions to the clock network while still being modeled in such a way that timing analysis can treat the clock buffer as a point source model. The present invention can be placed in a network design as a single logical entity, and yet be implemented as if it were multiple electrical entities.

Figure 1:
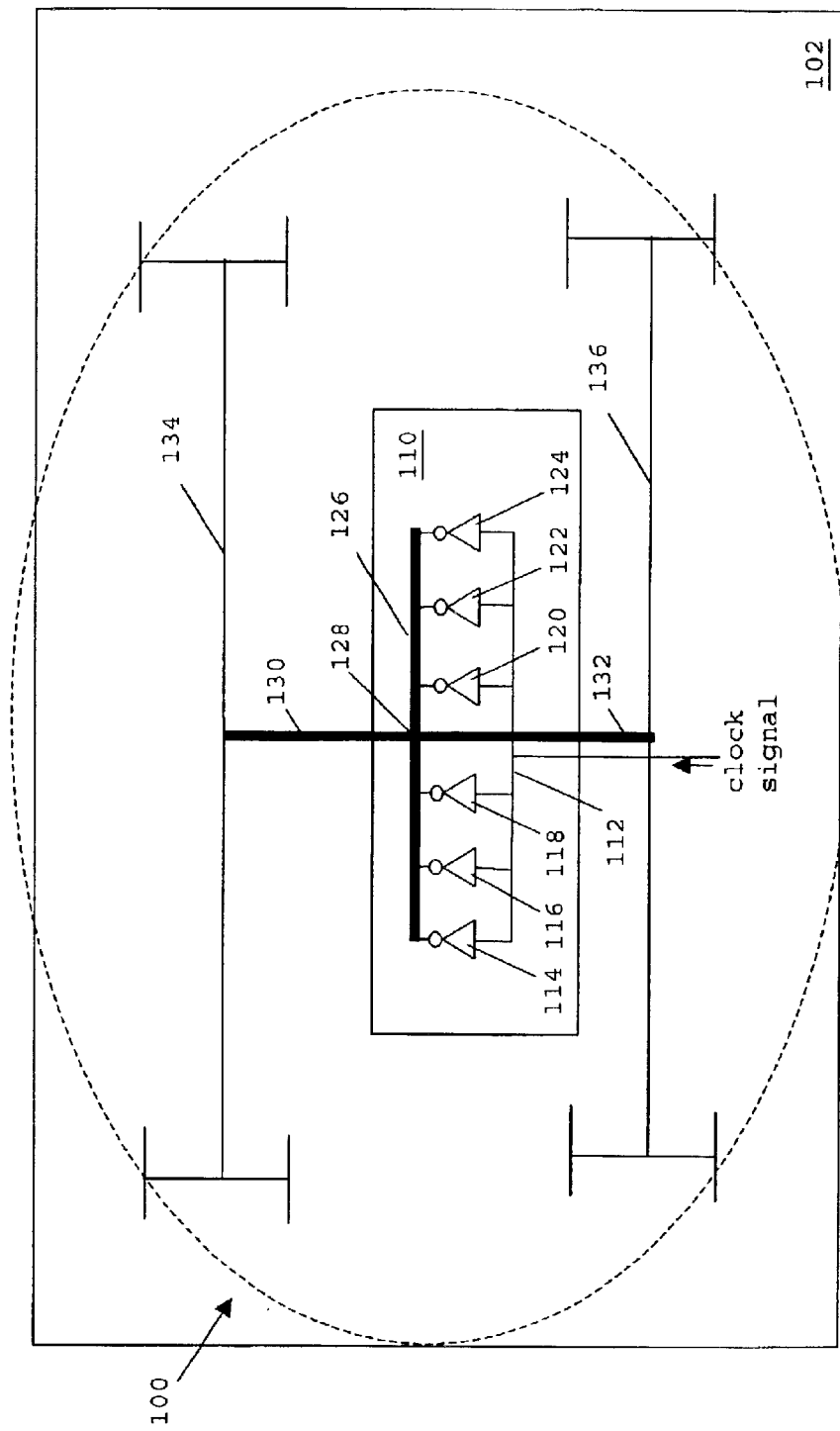
FIG. 1 illustrates a schematic diagram of a microprocessor having a clock network including a clock buffer found in the prior art.
Figure 2:
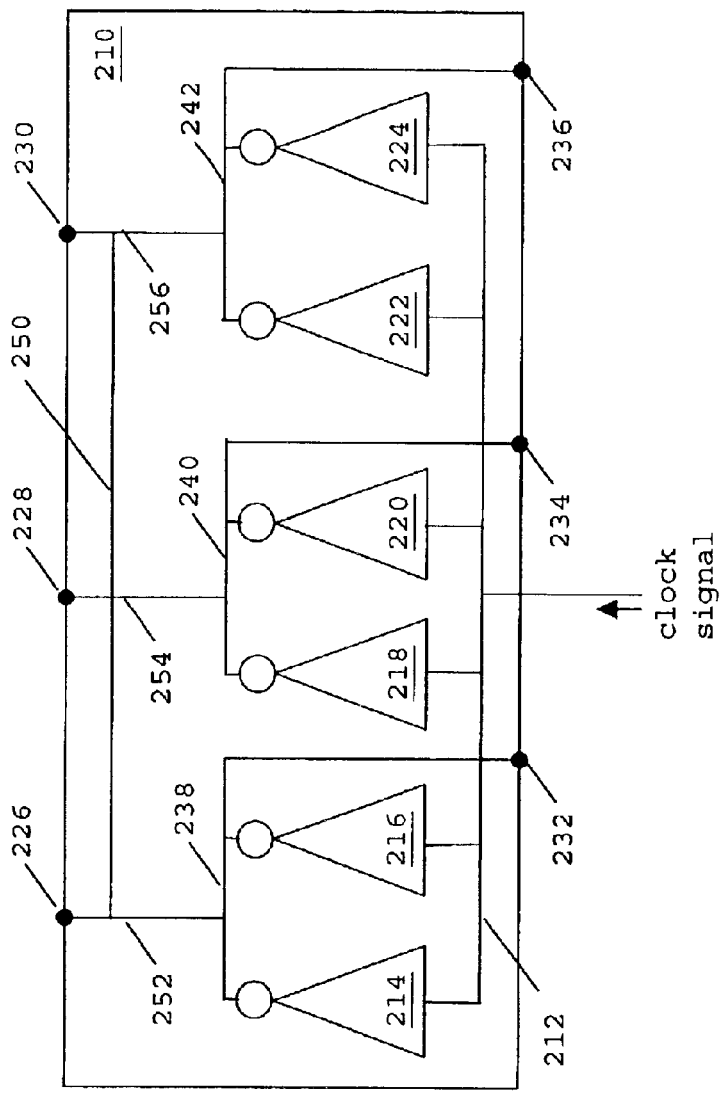
FIG. 2 illustrates a schematic diagram of a clock buffer having distributed drive strength according to one embodiment of the present invention.

FIG. 2 illustrates a schematic diagram of a clock buffer 210 having distributed drive strength according to one embodiment of the present invention. As illustrated, in one embodiment, clock buffer 210 includes: the inverters 214, 216, 218, 220, 222, and 224; the internal distribution wires 238, 240 and 242; a connector wire 250; the segment wires 252, 254 and 256; and the outputs 226, 228, 230, 232, 234, and 236, such as output pins. In other embodiments, inverters 214–224 can also be other amplifying devices, such as transistors, uniform banks of transistors, and uniform banks of inverters. In the present embodiment, each of inverters 214–224 generate the same output current that is selectively distributed over internal distribution wires 238–242 for output from multiple outputs 226–236.

In the present illustration, six inverters 214–224, three distribution wires 238–242, one connector wire 250, three segment wires 252–256, and six outputs 226–236 are shown to avoid unduly complicating the description of the present invention; however, those of skill in the art can recognize that the number of inverters, distribution wires, segment wires, and outputs can be varied (in accordance with the present invention herein described) to meet the needs of the microprocessor designer and dependent upon the application desired. For example, clock buffer 210 can include sixteen or thirty-two inverters together with associated distribution wires, segment wires, and outputs implemented according to the present invention.

In clock buffer 210, inverters 214–224 receive a clock signal input to wire 212. Inverters 214–224 are internally coupled in adjacent pairs to corresponding internal distribution wires 238, 240, and 242, respectively. Each distribution wire 238, 240, and 242 is internally coupled to connector wire 250 via respective segment wires 252–256 to outputs 226–236 for output of the current from clock buffer 210. More particularly, inverter 214 (a first inverter) and inverter 216 (a second inverter) are internally coupled to distribution wire 238 that is coupled to connector wire 250 via segment wire 252. Similarly, inverters 218 and 220 are internally coupled to distribution wire 240 that is internally coupled to connector wire 250 via segment wire 254, and inverters 222 and 224 are internally coupled to distribution wire 242 that is coupled to connector wire 250 via segment wire 256.

By coupling inverters 214–224 to distribution wires 238–242, the current of the paired inverters is selectively coupled to, or uncoupled from, connector wire 250. This arrangement enables the output drive strength to be proportionally allocated to outputs 226–236. Each distribution wire 238–242 and segment wire 252–256 is thus carrying a smaller, proportional amount of the total current, enabling the wire width of distribution wires 238–242 and segment wires 252–256 to be reduced and reducing the distance current must travel inside clock buffer 210 to get to an output 226–236.

Figure 3A:
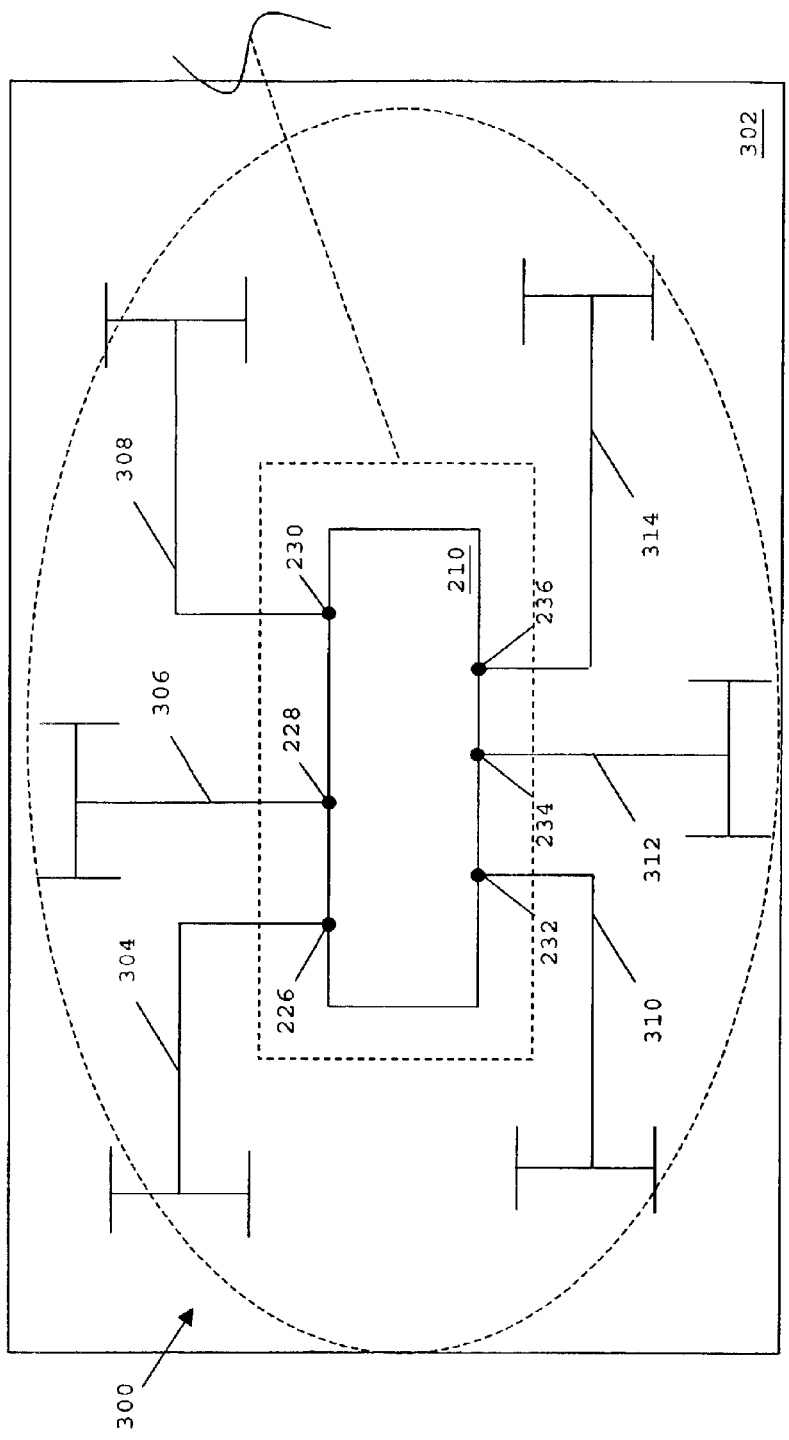
FIG. 3 is a key to FIGS. 3A and 3B that illustrate a schematic diagram of a microprocessor clock network including the clock buffer of FIG. 2 having distributed drive strength according to another embodiment of the present invention.
Figure 3B:
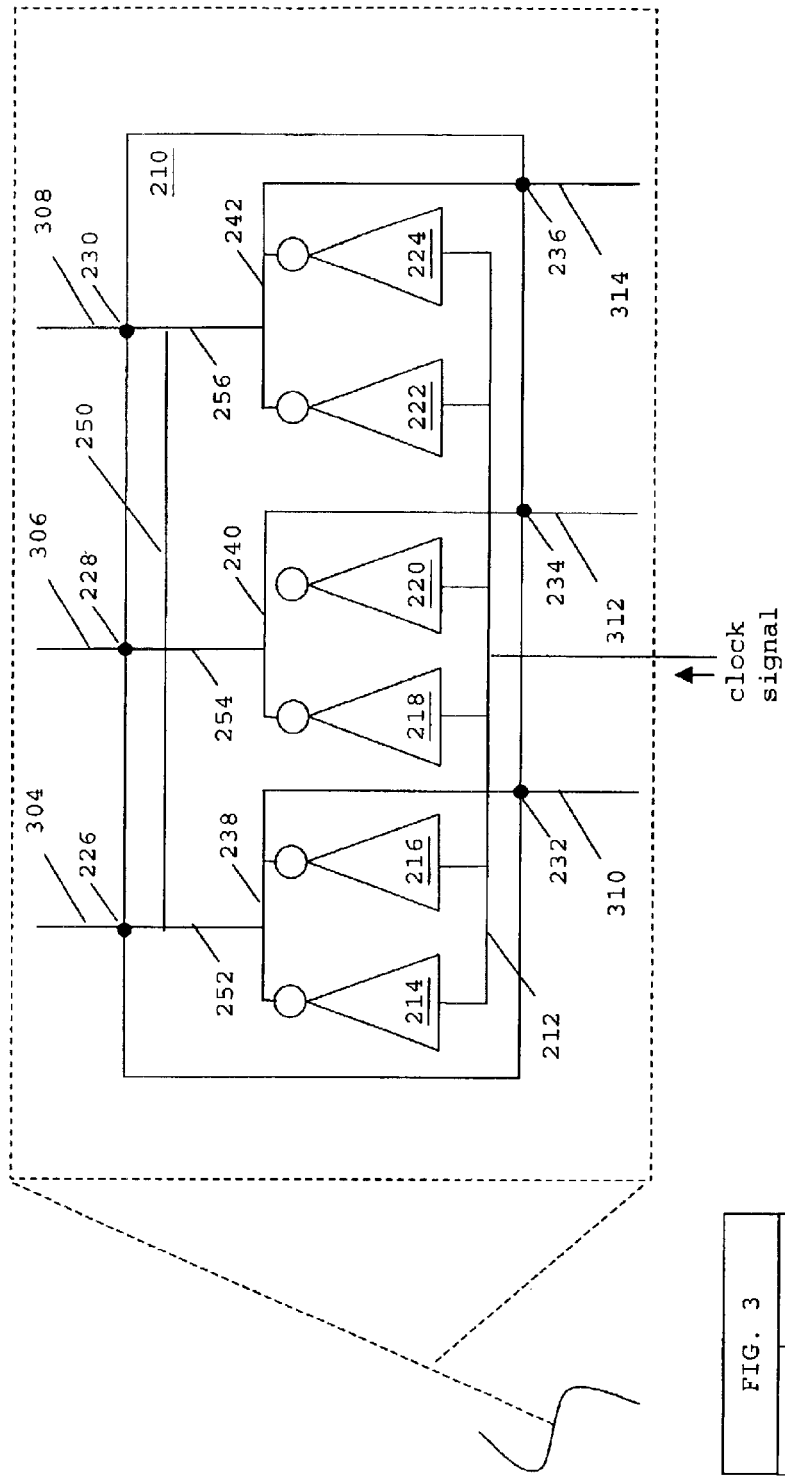

FIG. 3 is a key to FIGS. 3A and 3B that illustrate a schematic diagram of a microprocessor clock network 300 including clock buffer 210 of FIG. 2 having distributed drive strength according to another embodiment of the present invention. Referring now to FIGS. 3A and 3B together, in one embodiment, clock buffer 210 is coupled to clock network 300 at outputs 226–236. In one embodiment, outputs 226–236 are allocated proportionally to the load present in the direction of each network segment, such as by a clock router (not shown). For example, output 226 is allocated to the segment of clock network 300 supplied by wire 304, and output 228 is allocated to the segment of clock network 300 supplied by wire 306. Similarly, output 230 is allocated to the segment of clock network 300 supplied by wire 308, output 232 is allocated to wire 310, output 234 is allocated to wire 312, and output 236 is allocated to wire 314. In an H-tree clock network, ideally, each of the corners of the H-tree clock network, such as network 300, is directly coupled to outputs 226–236 of clock buffer 210.

As each of wires 304–314 is now driving a smaller portion of the total current from clock buffer 210, the wire widths of wires 304–314 can be as narrow as one-third ($\frac{1}{3}$) what they were in the prior art with the limit being the minimum wire geometry. Further, by pairing inverters 214–224 to corresponding distribution wires 238–242 and selectively coupling them by connector wire 250 to outputs 226–236, the distance current must travel inside clock buffer 210 to get to a corresponding output 226–236 is reduced, thus increasing the speed at which the current travels.

Additionally, clock buffer 210 is placed in the circuit design of clock network 300 as a single, logical element. Clock buffer 210 is one buffer with multiple source points, e.g., outputs 226–236. Thus, in accordance with FIG. 3, clock buffer 210 is logically one buffer, but electrically six.

Also, when utilizing a via array to route the current from clock buffer 210 to clock network 300, e.g., to wires 304–314, only a small via array is required, for example, a six via array, permitting all or nearly all the vias to be utilized, compared to three times as many vias in the prior art.

With regard to point source modeling of clock network 300, as each output 226–236 is driven by a proportional segment of the drive strength of clock buffer 210, calculating the delay from each inverter 214–224 to the output being used, is accomplished as if all of outputs 226–236 are placed in a straight line. In the present embodiment, an effective point source resistance can be calculated by dividing the total resistance of clock buffer 210 from the outside edge of inverter 214 to the outside edge of inverter 224 by the number of outputs, e.g., six, in the present embodiment. If resistance is now one-sixth ($\frac{1}{6}$) of what it was in the prior art, and capacitance is one-sixth ($\frac{1}{6}$) of what it was in the prior art, then the resistance-capacitance (RC) delay is $\frac{1}{36}$ of what is was in the prior art.

This resistance can be utilized in timing model equations used in timing analysis to provide a reasonable value for the average delay from any inverter 214–224 in clock buffer 210 to its associated output 226–236. If more accuracy is necessary, the resistance can be calculated based on the distance between each output 226–236 and then averaging. Further, in designing a network, a narrower wire can be used by sacrificing a small portion of the RC delay improvement.

FIG. 3 (FIGS. 3A and 3B) illustrated an embodiment of the present invention in which all of outputs 226–236 are utilized in routing current from clock buffer 210 to clock network 300. In some other embodiments, a clock network may not require the total clock drive strength provided by a clock buffer, such as clock buffer 210. In these other embodiments, unnecessary drive strength is selectively uncoupled from the outputs of the clock buffer as further described herein with reference to FIGS. 4A and 4B.

Figure 4A:
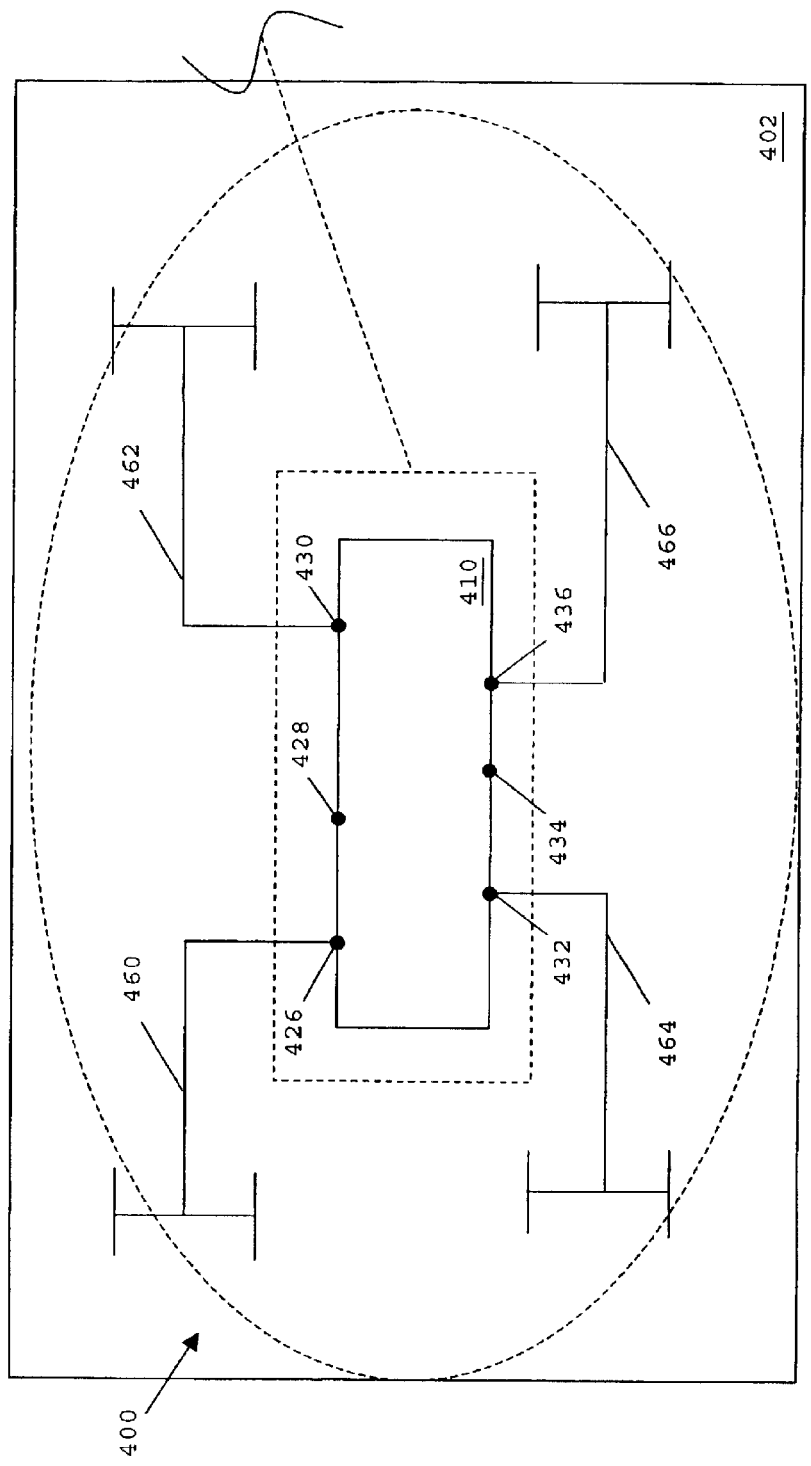
FIG. 4 is a key to FIGS. 4A and 4B that illustrate a schematic diagram of a microprocessor clock network 400 including clock buffer 410 having distributed drive strength according to another embodiment of the present invention.
Figure 4B:
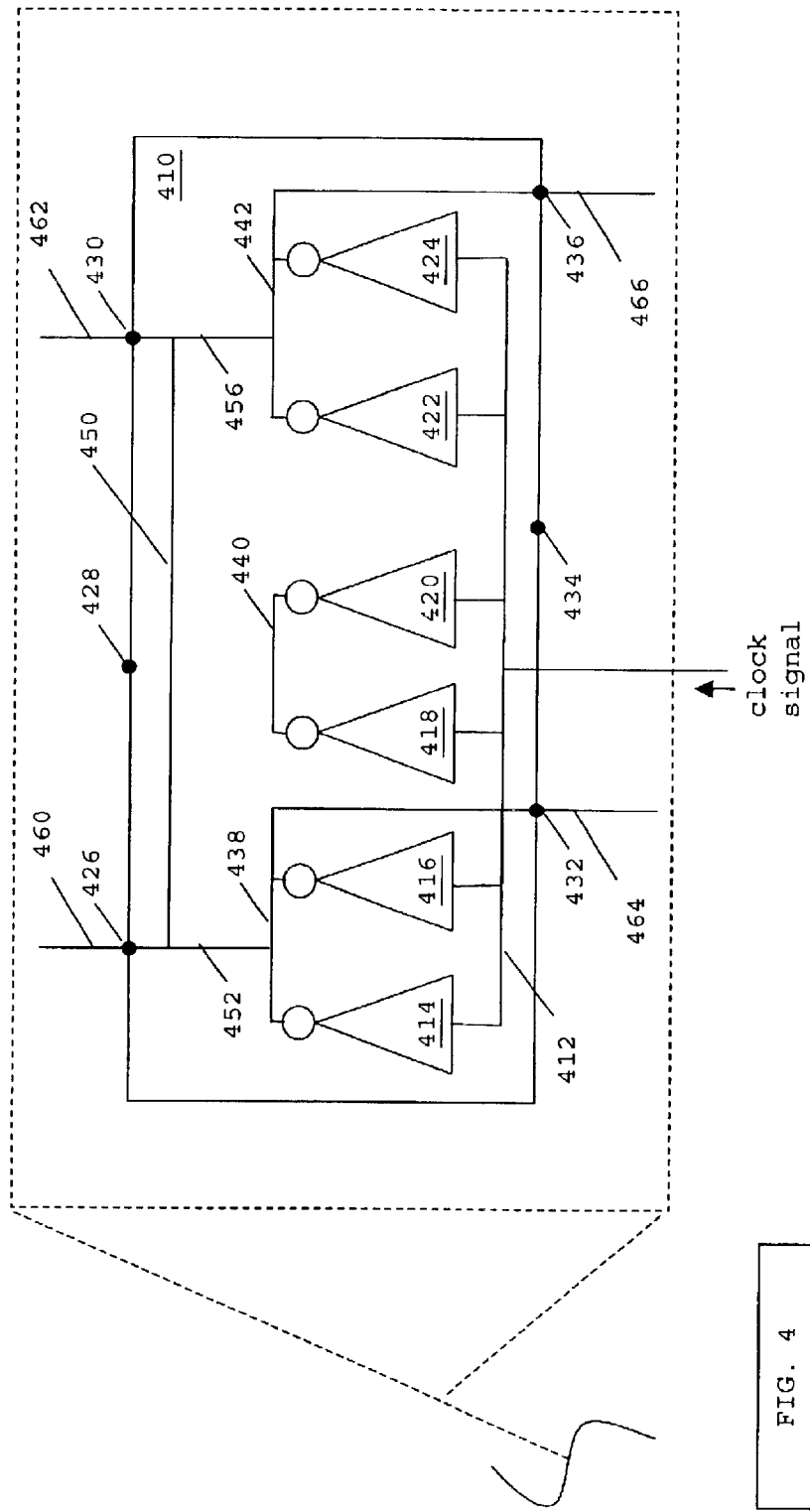

FIG. 4 is a key to FIGS. 4A and 4B that illustrate a schematic diagram of a microprocessor clock network 400 including a clock buffer 410 having distributed drive strength according to another embodiment of the present invention. In instances where all of the drive strength of clock buffer 410 is not required to support the current requirements of clock network 400, the present invention, proportionally distributes a lesser drive strength among some of the outputs 426–436 by selectively uncoupling distribution wires from the connector wire 450. In the present embodiment, distribution wires 438 and 442 are coupled to connector wire 450 while distribution wire 440 is uncoupled from connector wire 450. Referring now to FIGS. 4A and 4B together, in one embodiment, clock buffer 410 includes the inverters 414–424 that receive a clock signal input to wire 412. Clock buffer 410 supplies clock network 400 with the clock signal over wires 460, 462, 464, and 466. In one embodiment, some of outputs 426–436 are coupled to wires 460, 462, 464, and 466 to proportionally distribute the output drive strength over the width of clock buffer 410. In one example, wire 460 is assigned to output 426; wire 462 is assigned to output 430; wire 464 is assigned to output 432; and wire 466 is assigned to output 436.

Connector wire 450 distributes current from distribution wires 438 and 442 which are coupled to connector wire 450 via segment wires 454 and 456, respectively. Distribution wire 440 is not coupled to, e.g., is uncoupled from, connector wire 450, and thus current is not available from inverters 418 and 420 at outputs 428 and 434. By assigning wires 460–466 to outputs 426, 430, 432 and 436 in this manner, a lesser output drive strength is proportionally distributed over clock buffer 410 rather than centrally converged as in the prior art, and the current does not have to travel as far internally for output from clock buffer 410.

Figure 5:
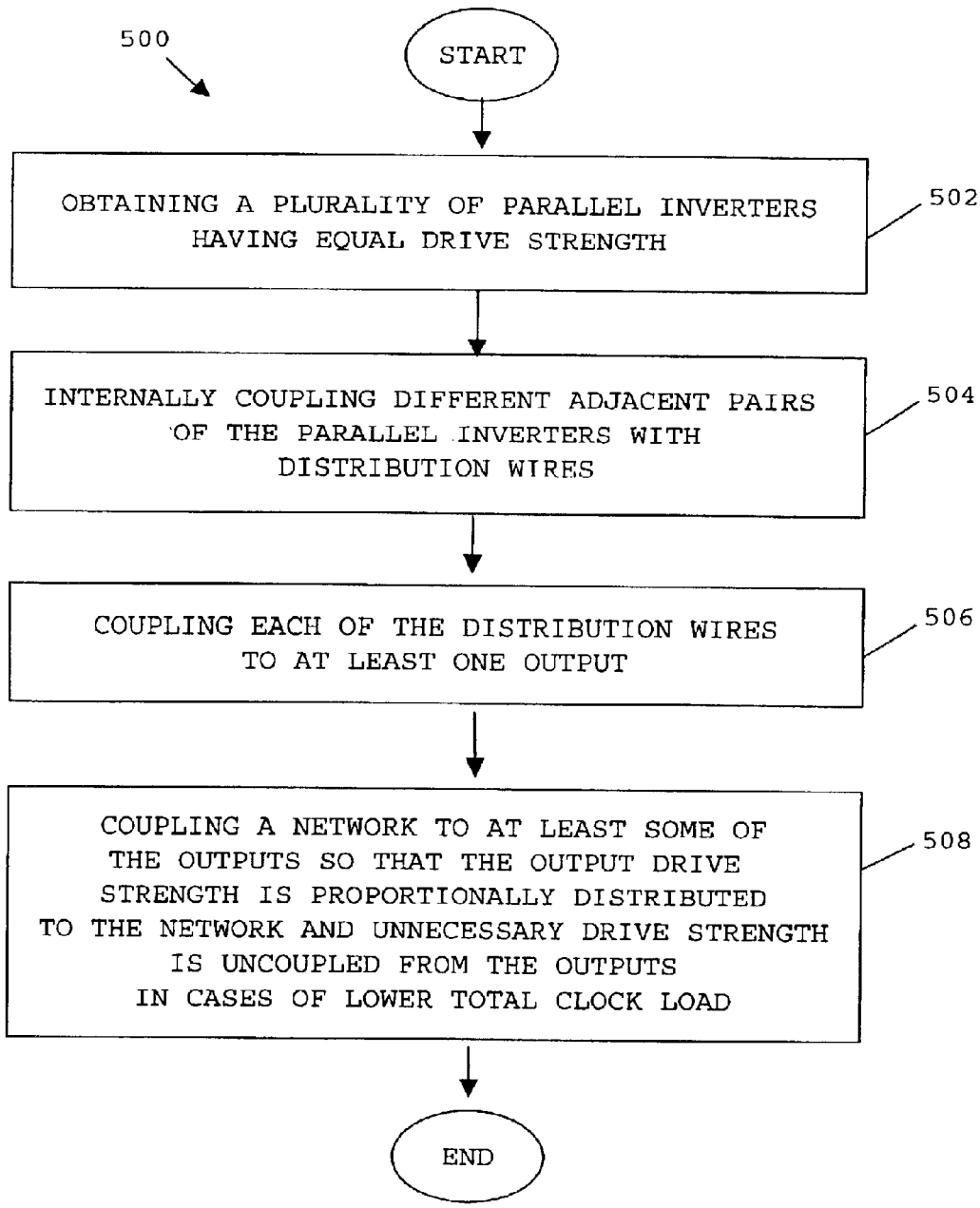
FIG. 5 illustrates a process flow diagram of a method 500 for dividing and distributing the drive strength of a single clock buffer according to one embodiment of the present invention.

FIG. 5 illustrates a process flow diagram of a method 500 for dividing and distributing the drive strength of a single clock buffer according to one embodiment of the present invention. According to process 500, at operation 502, a plurality of parallel inverters, or other amplifying devices, such as transistors, uniform blocks of inverters, and uniform blocks of transistors, are obtained. Each of the parallel inverters, or other amplifying devices, generate an equal amount of current. For example, referring to FIG. 3 (FIGS. 3A and 3B), inverters 214–224 are a plurality of parallel inverters having equal output current.

Returning to FIG. 5, flow moves from operation 502 to operation 504. At operation 504, different, adjacent pairs of the plurality of parallel inverters, or other amplifying devices, are internally coupled by different distribution wires. Referring to FIG. 3, inverters 214 and 216 are coupled by distribution wire 238, inverters 218 and 220 are coupled by distribution wire 240, and inverters 222 and 224 are coupled by distribution wire 242.

Returning to FIG. 5, flow moves from operation 504 to operation 506. At operation 506, at least one of the distribution wires is internally coupled to at least one output. Referring to FIG. 3, distribution wires 238, 240 and 242 are coupled outputs 226–236 via wire segments 252–256 and connector wire 250.

Returning to FIG. 5, flow moves from operation 506 to operation 508. At operation 508, at least a portion of the outputs are coupled to a clock network so that the drive strength of the clock buffer is proportionally output and distributed to the clock network. Referring to FIG. 3, each of outputs 226–236 are coupled to network 300 by wires 304–314, thus each of wires 304–314 receive the same proportional amount of the drive strength of clock buffer 210. Further, unnecessary drive strength of a clock buffer is uncoupled from the outputs in instances where a lower total drive strength, e.g., clock load, is needed. Referring to FIG. 4, inverters 414 and 416 on distribution wire 438 and inverters 422 and 424 on distribution wire 442 are coupled to connector wire 450 (via segment wires 452 and 456) which enables current flow to outputs 426, 430, 432 and 436 and provides proportional amounts of the output drive strength of clock buffer 410 to network 400. Inverters 418 and 420 on distribution wire 440 are uncoupled from connector wire 450, e.g., no segment wire, and thus current from inverts 418 and 420 is unavailable to outputs 428 and 434.

As a result of these and other features discussed in more detail above, the present invention provides devices and methods for dividing and proportionally distributing the drive strength of a clock buffer for more efficient output to a clock network without the drawbacks of prior art techniques. Consequently, devices, methods, and networks designed according to the principles of the present invention can provide for more efficient clock signal routing in microprocessors.

The foregoing descriptions of implementations of the present invention have been presented for purposes of illustration and description, and therefore are not exhaustive and do not limit the invention to the precise forms disclosed. Modifications and variations are possible in light of the above teachings or can be acquired from practicing the invention. In particular it can be appreciated by those of skill in the art that while the present invention is described with reference to a clock buffer and clock networks, the principles can also be applied to other buffer structures that provide current to a network structure. Further herein, a means for performing a particular function is accomplished using the appropriate related hardware necessary to performing the function.

Consequently, the scope of the invention is defined by the claims and their equivalents.

What is claimed is:

1. A clock buffer having an output drive strength, the clock buffer comprising:
   a plurality of parallel amplifying devices, each of the plurality of parallel amplifying devices for generating equal drive strengths;
   a plurality of outputs, at least some of the plurality of outputs conductively coupled to the plurality of parallel amplifying devices such that the output drive strength of the clock buffer is divided proportionally among the plurality of outputs;
   a plurality of distribution wires, each of the plurality of distribution wires conductively coupling different adjacent ones of the parallel amplifying devices; and
   a connector wire, the connector wire conductively coupling selected ones of the plurality of distribution wires to at least some of the plurality of outputs such that the output drive strength of the clock buffer is divided proportionally among the plurality of outputs.

2. The clock buffer of claim 1, wherein each of the plurality of parallel amplifying devices is an inverter.

3. The clock buffer of claim 1, wherein each of the plurality of parallel amplifying devices is a transistor.

4. The clock buffer of claim 1, wherein the at least some of the plurality of outputs are internally conductively coupled to the plurality of parallel amplifying devices such that the output drive strength of the clock buffer is divided proportionally among the plurality of outputs.

5. A network comprising:
   a buffer device having an output drive strength, the buffer device dividing and proportionally distributing the output drive strength for output over multiple outputs;
   a plurality of network segments coupled to at least some of the multiple outputs of the buffer device; and
   a plurality of wires coupling the at least some of the multiple outputs of the buffer device to the plurality of network segments, the plurality of wires being coupled to at least some of the multiple outputs of the buffer device such that the drive strength of the buffer device is proportionally distributed over the buffer device and output to the network segments.

6. The network of claim 5, wherein the buffer device further comprises:
   a plurality of amplifying devices; and a plurality of outputs conductively coupled to the plurality of amplifying devices such that the output drive strength of the buffer device is divided proportionally among the plurality of outputs.

7. The network of claim 6, wherein the plurality of outputs are conductively coupled to the plurality of amplifying devices by a connector wire such that the output drive strength of the buffer device is divided proportionally among the plurality of outputs.

8. The network of claim 5, wherein the connector wire is selectively coupled to at least one of a plurality of distribution wires, wherein each of the plurality of distribution wires conductively couples a first amplifying device and a second amplifying device of the plurality of amplifying devices, the first amplifying device being adjacent to the second amplifying device.

9. The network of claim 5, wherein the plurality of outputs are internally conductively coupled to the plurality of amplifying devices.

10. The network of claim 5, wherein the amplifying devices are parallel inverters.

11. The network of claim 5, wherein the amplifying devices are transistors.

12. A method for dividing and distributing the drive strength of a single clock buffer to a clock network, the method comprising:

obtaining a plurality of parallel inverters, each of the plurality of parallel inverters generating an equal drive strength;

internally coupling different adjacent pairs of the plurality of parallel inverters with a plurality of distribution wires, wherein each one of the plurality of distribution wires couples a different adjacent pair of the plurality of parallel inverters;

internally coupling at least some of the plurality of distribution wires to at least some of a plurality of outputs, wherein each of the at least some of the plurality of outputs is coupled to a different distribution wire such that the output drive strength of the clock buffer is divided proportionally among the plurality of outputs; and coupling segments of a clock network to at least some of the plurality of outputs so that the drive strength of the clock buffer is proportionally distributed to the clock network.

13. The method of claim 12, wherein the at least some of the plurality of distribution wires are internally coupled to the at least some of the plurality of outputs by a connector wire such that the output drive strength of the buffer device is divided proportionally among the at least some of the plurality of outputs.

14. A buffer device having an output drive strength, the buffer device comprising:

at least a first inverter;

at least a second inverter adjacent the first inverter, the second inverter coupled to the first inverter, the first and second inverters for generating at least a portion of the output drive strength; and at least a first coupled output of a plurality of coupled outputs of the buffer device, the first coupled output coupled to the first and second inverter such that the output drive strength of the buffer device on the first coupled output is the same proportion of the output drive strength of the buffer device output on the remaining plurality of coupled outputs of the buffer device.

15. The buffer device of claim 14, further comprising:

a distribution wire, the distribution wire internally coupling the first and second inverters.

16. The buffer device of claim 15, further comprising:

a connector wire, the connector wire internally coupling the distribution wire to the at least a first coupled output.

17. The buffer device of claim 14, wherein the buffer device is a clock buffer.

18. A buffer device having an output drive strength, the buffer device comprising:

a plurality of amplifying devices, at least a portion of the plurality of amplifying devices for generating the output drive strength of the buffer device;

a plurality of outputs, at least a portion of the plurality of outputs for outputting the output drive strength from the buffer device; and means for conductively coupling the plurality of outputs to the plurality of amplifying devices such that the output drive strength of the buffer device is divided proportionally among the plurality of outputs.

19. The buffer device of claim 18, wherein the plurality of outputs are internally conductively coupled to the plurality of amplifying devices.

* * * * *